March 4, 1947.       G. W. JAMES       2,416,755
BATTERY
Original Filed April 10, 1943
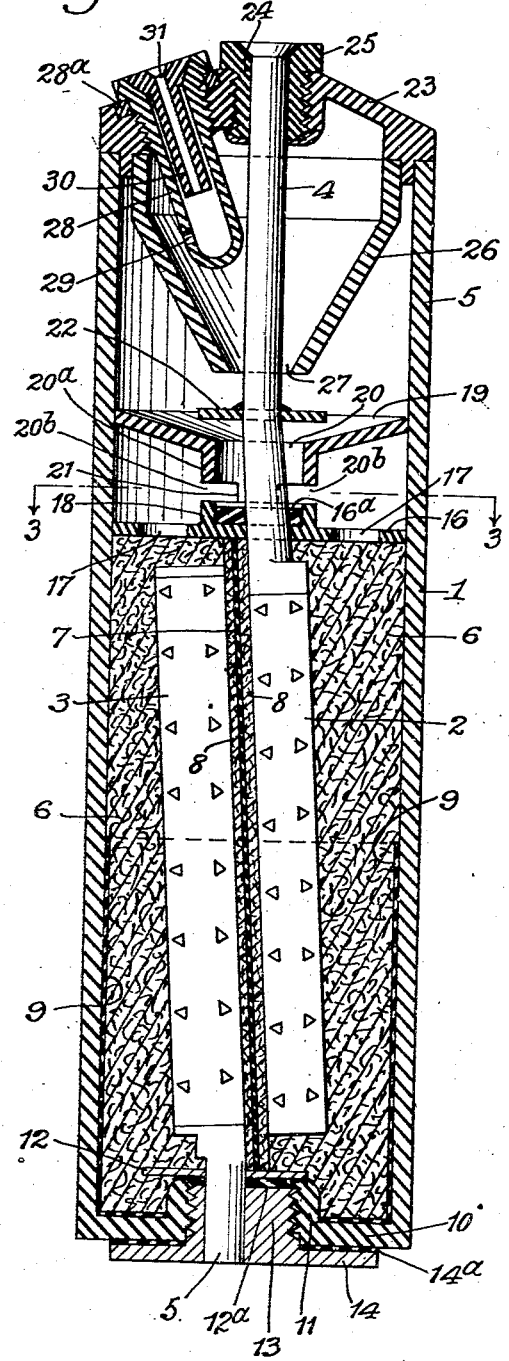
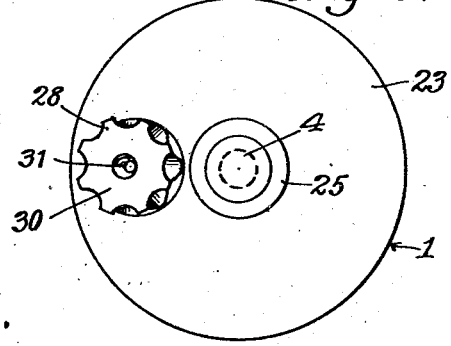
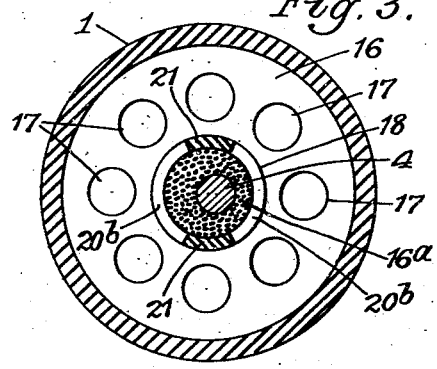
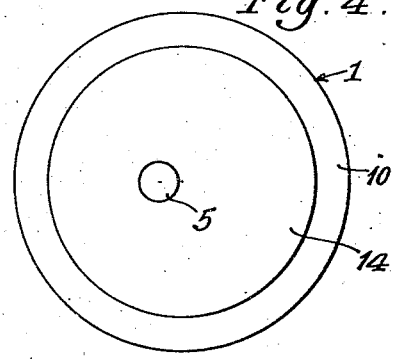
Inventor
Gerald W. James
by Parker & Carter.
Attorneys.

Patented Mar. 4, 1947

2,416,755

UNITED STATES PATENT OFFICE 2,416,755

BATTERY

Gerald W. James, Sycamore, Ill., assignor, by mesne assignments, to Ideal Industries, Inc., Sycamore, Ill., a corporation of Delaware Original application April 10, 1943, Serial No. 482,581. Divided and this application September 22, 1944, Serial No. 555,286

3 Claims. (Cl. 136—6)

This invention relates to storage batteries, and has for its object to provide a new and improved device of this description.

The invention has, as a further object, to provide a storage battery of the wet type.

The invention has as a further object to provide a wet type battery with means for preventing the electrolyte from leaking out at either end of the casing.

The invention has as a further object to provide a wet type battery for various uses and which is particularly adapted to be used in connection with a flashlight.

The invention has as a further object to provide an efficent, durable and self-contained wet battery which can be moved into any desired and necessary position.

The invention has further objects which are more particularly pointed out in the accompanying description.

Figure 1 is a longitudinal sectional view through one form of battery embodying the invention.

Figure 2 is a top plan view of the battery shown in Fig. 1.

Figure 3 is a sectional view taken on line 3—3 of Fig. 1.

Figure 4 is a bottom view of the battery shown in Fig. 1.

Like numerals refer to like parts throughout the several figures.

In the particular construction shown there is a casing 1, which is preferably made of some plastic material which is transparent or semi-transparent. One plastic material which gives very satisfactory results is methyl methacrylate, having a trade name "Lucite." It is, of course, evident that the casing may be made of other material.

Within the casing are the plates 2 and 3, which are preferably of grid form; plate 2 being the negative plate and plate 3 the positive plate. Connected with the plate 2 is the lead 4, and connected with the plate 3 is the lead 5. Placed within the casing and surrounding the plates is an absorbent material 6 for the electrolyte. This absorbent material may be, for example, glass wool. Located between the plates 2 and 3 is a separating device which consists of material not adversely affected by the electrolyte, which may be of rubber or wood for example.

As herein shown, this device consists of the central piece 7 of rubber, having on opposite sides the woven or felted glass mats 8. There is preferably a coating of wax 9 inside the casing 1, extending from the bottom upwardly for a portion of the length of the casing. The electrolyte is absorbed by the glass wool which holds it in place and yet permits it to make proper contact with the plates 2 and 3.

The casing 1 is preferably provided with an integral bottom 10, which has an inwardly projecting recessed portion 11. Screw threaded into this recess is a metal plug 13, which has an enlarged head 14 on the exterior of the casing, and which fits tightly against the bottom of the casing when the plug is screwed into position. There is a positive stem washer 12 extending across the top of the inwardly projecting recessed portion. There is an opening through the member 12 and through the plug 13, into which the lead 5 is received and is sealed tightly therein. This sealing may be accomplished in any desired manner. As herein shown, this sealing is done by means of a pitch seal 12a which is preferably applied in a hot condition so that it covers the end of the metal plug 13 and passes down partly therealong in the screw threads and has a sealing fit with the lead 5 to insure a complete seal and prevent with escape of any liquid from the casing 1. There is also preferably a pitch seal 14a between the enlarged head 14 of the plug 13 and the bottom of the casing 1.

The glass wool 6 only partially fills the casing, there being at the top an empty space 15. Extending across the casing in proximity to the top surface of the glass wool is a washer 16, the periphery of which fits tightly against the inner surface of the casing 1, through which the lead 4 passes, preferably with a tight fit sealed by the sealing material 16a. This washer is provided with a series of openings 17 spaced around the washer and located at a distance from its periphery (see Fig. 3), and is preferably provided with a hub portion 18. A funnel member 19 is located above the washer 16 and has a tight fit at the edges with the interior face of the casing 1. This funnel has a central opening 20 and a projecting hub 20a provided with one or more projections 21, which engage the hub 18 of the washer 16.

Mounted upon the lead 4, above the opening 20 in the funnel member 19, is a baffle washer 22, which has a tight non-leaking fit with the lead 4, and which is somewhat larger than the opening 20 in the funnel member 19. The washer 16, funnel member 19, and baffle washer 22, as hereinafter set out, prevent the electrolyte from leaking out of the casing when the battery is turned upside down. The casing 1 is open at the top and is provided with a cover 23 which is arranged to have a leak-tight connection with the casing 1. This cover is provided with a central opening having interior threads, and there is a plug 24 threaded into this opening, which has an enlarged head 25 which engages the wall around the opening. The lead 4 passes through this plug and has a leak-tight connection therewith.

Connected to the cover 23 by a leak-tight connection is a funnel shaped baffle member 26, through which the lead 4 passes and which has at its end the opening 27. At one side of the opening in the cover for the plug 24 is another opening with internal screw threads into which is received a tube 28 having screw threads for engaging the screw threads of the opening. There is a washer 28a which is engaged by the enlarged end of the tube 28 so as to make a tight joint. This washer is of any suitable material such as rubber of Vinylite. This tube is open at the top and closed at the bottom, but has an opening 29 at a short distance from the bottom. Within the tube 28 is a second tube 30, from which is provided with a passageway 31 extending therethrough. Water or electrolyte may be added to the casing by removing the tubes 28 and 30 and inserting the liquid through the opening thus produced. The liquid then passes through the opening 27 and into the funnel member 29 and through the openings 20 and 20b, and through the openings 17 into the space containing the glass wool 6.

If the battery is turned on its side, for example, the periphery portion of the washer 16 acts to prevent the liquid from running out. If the battery is turned upside down and there is any surplus liquid therein this liquid will pass through the openings 17 and be stopped by the funnel washer 19. If there should be sufficient liquid to fill the space between the funnel washer 19 and the washer 16 to a level beyond the openings 20b, this liquid would then pass through the opening 20 and be diverted by the washer 22 so that it would pass in between the funnel shaped baffle member 26 and the inner face of the casing 1, and thus be prevented from escaping from the casing 1. If there should be enough liquid to reach the opening 27 in the member 26, this surplus liquid would pass into the interior of the funnel shaped member 26 and would be held in the casing. If there should be sufficient liquid to rise above the opening 29 in the tube 28, the liquid would then pass into the tube 28 and still be held in the casing by the tube 30. It will thus be seen that liquid cannot escape, but that gas from the casing can escape out through the passageway 31.

The positive plate is preferably larger in volume of material than the negative plate and is usually made 25% larger in volume.

This application is a division of my co-pending application 482,581 filed April 10, 1943.

I claim:

1. In combination in a battery having a casing, positive and negative plates in said casing, absorbent material surrounding said plates for absorbing a liquid electrolyte, a cover for said casing, said casing having a bottom integral therewith, said bottom having an inwardly projecting hollow part with internal screw threads, a plug having a projecting part with screw threads thereon which engage the screw threads in said hollow projection, and which is confined within said hollow projection so that no part of the plug projects into the interior space of the casing, a lead extending from one of said plates into said plug and having a liquid-tight connection therewith, and a laterally extended, generally flat member in sealed relation about said lead and in sealed relation with the upper surface of said hollow projection.

2. In combination in a battery having a casing, positive and negative plates in said casing, absorbent material surrounding said plates for absorbing a liquid electrolyte, a cover for said casing, said casing having a bottom integral therewith, said bottom having an inwardly projecting hollow part with internal screw threads, a plug having a threaded part which engages the screw threads in said hollow projection so that no part of the plug projects into the interior space of the casing, a lead extending from one of said plates through said cross member and into said plug and having a liquid-tight connection therewith and a washer on the interior of the casing supported by the inwardly projecting hollow part of said bottom and having an opening in which said lead is received with a liquid-tight connection.

3. In combination in a battery having a casing, positive and negative plates in said casing, absorbent material surrounding said plates for absorbing a liquid electrolyte, a cover for said casing, said casing having a bottom integral therewith, said bottom having an inwardly projecting hollow part with internal screw threads, a plug having a threaded part with screw threads thereon which engage the screw threads in said hollow projection, the hollow projection surrounding the threaded part of said plug so that no part of the plug projects into the interior space of the casing, a lead extending from one of said plates through said cross member and into said plug and having a liquid-tight connection therewith, and a washer on the interior of the casing supported by said inwardly projecting part of said bottom and having an opening in which said lead is received with a liquid-tight connection, the other plate having a part which rests upon said washer.

GERALD W. JAMES.

REFERENCES CITED

The following references are of record in the file of this patent:

UNITED STATES PATENTS

| Number | Name | Date |
|---|---|---|
| 287,812 | Felton | Nov. 6, 1883 |
| 1,403,737 | Crissey | Jan. 17, 1922 |
| 2,000,199 | Stanley | May 7, 1935 |
| 2,266,686 | Emanuel | Dec. 16, 1941 |
| 1,585,874 | Powell | May 25, 1926 |